US010437809B1

(12) United States Patent
Xiao et al.

(10) Patent No.: US 10,437,809 B1
(45) Date of Patent: Oct. 8, 2019

(54) PROJECTION-BASED UPDATES

(71) Applicant: Amazon Technologies, Inc., Seattle, WA (US)

(72) Inventors: Wei Xiao, Bellevue, WA (US); Jeffrey Hocheng Nieh, Mountain View, CA (US); Fahad Ahmed, Santa Clara, CA (US); David Craig Yanacek, Seattle, WA (US); Andrew Desmond Budiman, Sunnyvale, CA (US); Usman Ahmed Shami, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 641 days.

(21) Appl. No.: 14/868,086

(22) Filed: Sep. 28, 2015

(51) Int. Cl.
  *G06F 17/30* (2006.01)
  *G06F 16/23* (2019.01)
  *G06F 16/22* (2019.01)

(52) U.S. Cl.
  CPC .......... *G06F 16/23* (2019.01); *G06F 16/2272* (2019.01)

(58) Field of Classification Search
  CPC .............................. G06F 16/23; G06F 16/2272
  See application file for complete search history.

(56) References Cited

U.S. PATENT DOCUMENTS

| 8,677,319 | B2 * | 3/2014 | Clemm | G06Q 10/10 |
| | | | | 717/100 |
| 9,524,302 | B2 * | 12/2016 | Regni | G06F 17/30227 |
| 9,659,045 | B2 * | 5/2017 | Liu | G06F 17/30327 |
| 9,659,048 | B2 * | 5/2017 | Ding | G06F 16/2255 |
| 9,860,314 | B2 * | 1/2018 | Kore | H04L 67/1095 |

* cited by examiner

*Primary Examiner* — Debbie M Le
(74) *Attorney, Agent, or Firm* — Davis Wright Tremaine LLP (57) ABSTRACT

A repository of key-value data may store a first object value having an internal structure of a hierarchy of sub-objects. The repository may receive a request to modify the first object, expressed as a projection of locations in the object to be updated and a function that, upon evaluation, returns values to be used to update the projected locations of the object. The repository may determine that the locations specified by the projections correspond to non-overlapping regions of the object and, based on the determination, update the object using the results of evaluating the function.

20 Claims, 10 Drawing Sheets

PROJECTION-BASED UPDATES

BACKGROUND

Databases may sometimes be configured to store structured or semi-structured data within a single field. A database may, for example, store a binary file or document in a field at some position within a row of data. When structured or semi-structured data is stored in this manner, conventional database techniques for updating the data in the field may not be adequate, since the database may not be aware of the data's internal structure. Various other techniques have been used to update structured or semi-structured data stored in a database field. However, many of these techniques have aspects that are complex and unwieldy. One of the aspects involves how targets to the update expression are specified.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Disclosed herein are systems, methods, and computer program products for performing updates on structured or semi-structured objects, such as a JavaScript Object Notation ("JSON") objects. Updates to such objects may be based on an update expression that utilizes functional language statements for the "right-hand" side of an update expression, such as the "f(y)" in the update expression "x·y=f(y)." The expressions on the right-hand side of the update expression may specify immutable functions that correspond to projections on the left-hand side of the expression.

The use of functional language elements for the right-hand side of the update expression may be distinguished from the use of procedural languages or declarative languages such as SQL. A procedural or declarative statement would typically process a JSON or other structured object in-place, meaning that a single copy of the object would be loaded into memory and manipulated by a series of operations. When procedural languages are used to specify a query, care must be taken to ensure that operations are expressed in the right order, since changing the order in which the operations are executed can change the results of performing the operations on the object. A similar problem may exist with declarative languages. Using the function-oriented approach described herein, many of these ordering issues may be avoided since the evaluation of any given function (with limited exceptions) does not cause side effects on the target object. The target object is instead only modified once the top-level function in the query has been fully evaluated.

One aspect of using function-based updates involves the "left-hand" side of the update expression. The left-hand side of the update expression "x·y=f(y)," for example, is "x·y." The left-hand side may indicate which portions or regions of the object are to be updated using the results of evaluating the right-hand side of the update expression. In various instances and embodiments of the present disclosure, projections may be used to specify which portions of an object are to be updated. In these instances and embodiments, there may also be restrictions imposed by the embodiments on the projections that may be employed.

In an example, a distributed database may comprise computing nodes connected to a storage device on which data managed by the database is stored. The computing nodes may further comprise a memory on which computer-executable instructions are stored. When executed by a processor of the computing nodes, the instructions may cause the distributed database to process requests to store, access, and modify data stored on the system.

The distributed database may process a request to update a JSON object held in the memory of the storage device. A JSON object may possess an internal structure that comprises a collection of name-value pairs. The values may themselves be objects, resulting in a nested hierarchy of objects and sub-objects. The distributed database may process the request to modify the JSON object. The request may be expressed as an update expression comprising a left-hand side that represents the target of the update, and a right-hand side that represents one or more functions, which, when evaluated, act as the source of the data used for updating the object.

A component of the distributed database, such as a storage engine or query analyzer, may identify one or more expressions that represent the right-hand side of an update expression. In other words, the expressions may represent the source of the data that is to be used to update the object. The expressions may comprise one or more functions that are to be evaluated in order to obtain the source data for the update.

The storage engine or query analyzer may also identify expressions in the update expression that are indicative of a first portion of an object that is to be modified by processing the update expression. The first portion may refer to a location in a hierarchy of sub-objects that make up the object.

The component of the distributed database may also identify a second portion of the object. The second portion may also be indicative of a portion of the object that is to be modified by processing the update expression. In some instances, the first and second portions of the object may be identified in a projection expression included in the update expression.

The storage engine or query analyzer may also determine that the first portion of the object does not overlap with the second portion. Each portion may represent a region of a sub-hierarchy of objects. If these regions do not overlap (for example, by sharing a common element), the storage engine or query analyzer might update the regions of the object with the results obtained from evaluating the right-hand, or source, side of the update expression.

Figure 1:
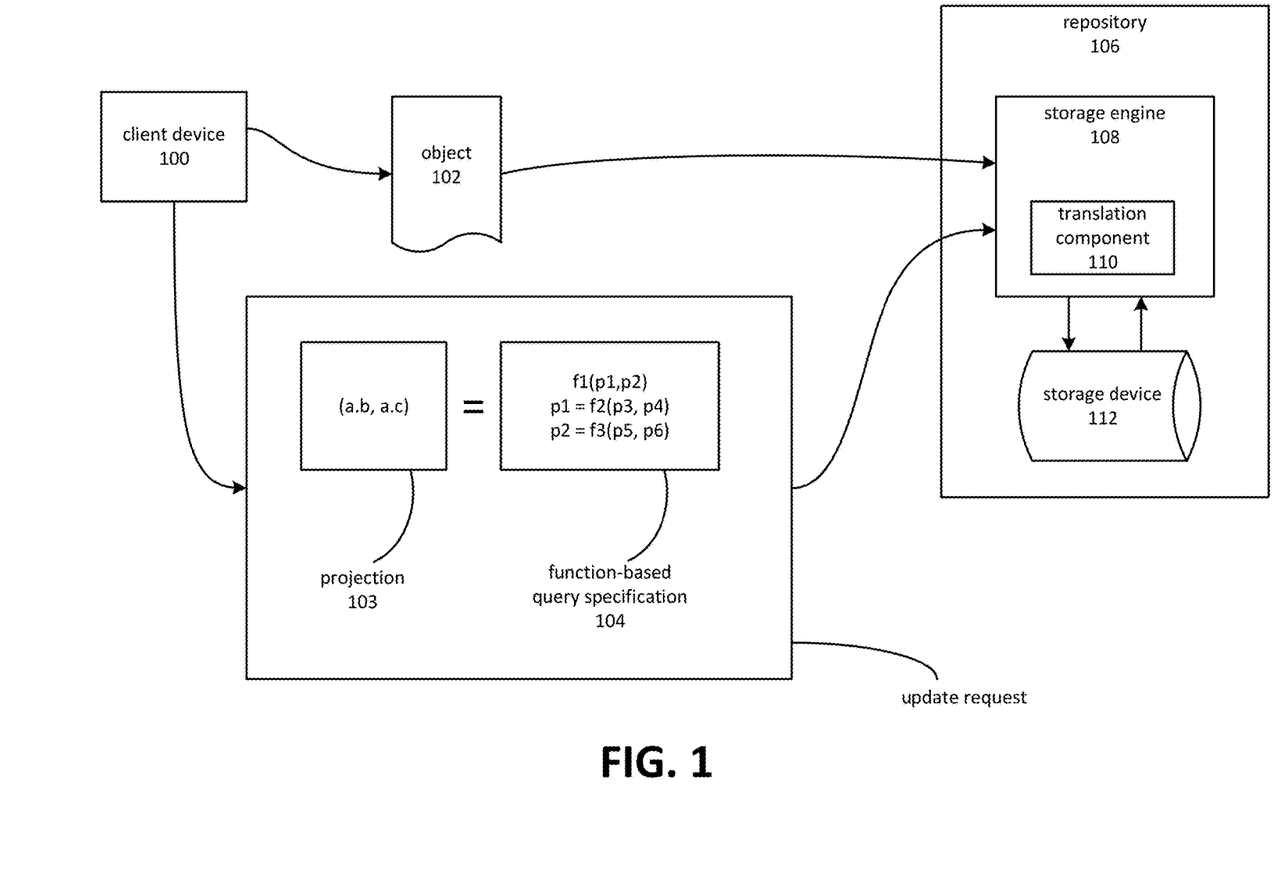
FIG. 1 is a block diagram depicting an example of a system configured as a repository for structured objects.

FIG. 1 is a block diagram depicting an example of a system configured as a repository for structured objects. A repository 106 can include a storage engine 108 with a translation component 110, and a storage device 112.

Examples of a repository include database systems such as relational and non-relational databases. In some instances, for example, the repository 106 may include computing nodes configured as a distributed key-value database system. In a key-value database system, a value may be indexed in the repository 106 using a corresponding key value. The value may therefore be stored and retrieved using the key value. Note that in many cases, a key may correspond to a collection of values, rather than a single value.

The storage engine 108 coordinates storing and retrieving data items from the storage device 112. The storage engine 108 may also perform aspects of query processing. A query may specify instructions for storing, retrieving, or modifying data items stored on the storage device 112. Aspects of query processing may include performing operations, as described herein, that pertain to operations performed on a particular value. For example, an object $O_1$ might be stored in the repository 106 using a key value $K_1$. A query might be performed on the object $O_1$ in which a portion of $O_1$ is examined. In some cases, the query might specify that the object $O_1$ should be replaced in storage with a new object $O_2$ that has been updated based on instructions included in the query.

In the example of FIG. 1, the object $O_1$ is stored on the storage device 112 in response to object 102 being inserted, at the direction of client device 100, into the repository 106. The object 102 may consist of a hierarchy of sub-objects. Examples of sub-objects include single values, tuples, and nested sub-objects. In one example, the object 102 may comprise a JSON object. An object may comprise additional sub-objects organized as a hierarchy. The hierarchy may have one or more levels. Where the hierarchy has a single level, it may be equivalent to a list, array, or other similar object. Accordingly, the term "hierarchy" may encompass lists, arrays, or other similar structures.

A request to update the object $O_1$ stored on storage device 112 may be issued by a client device 100. The request to update the object $O_1$ may comprise two portions, as may be seen in the following example, which is not intended to be limiting. A request to update the object $O_1$ might be expressed using the syntax target=source, where target might be a reference to one or more regions of the hierarchy of sub-objects contained within $O_1$, and source is an expression defining how the regions of the target are to be updated.

The target portion of the expression may be referred to as a projection. In the example of FIG. 1, projection 103 is expressed as a tuple of two identifiers, ("a·b" and "a·c"). This may indicate that the two regions a·b and a·c of the hierarchy of sub-objects that make up the object $O_1$ are the targets of the update request. The identifiers "a·b" and "a·c" may be described as paths. The syntax used to express a path may vary. However, in general terms, a path may comprise information suitable for locating a position in the hierarchy of sub-objects. There may, for example, be a name or other identifier associated with each node of the hierarchy of sub-objects, which may be traversed using the path information.

The source portion of the request may be represented by a function-based query specification 104. The function-based query specification 104 is distinguished from other forms of query specifications such as those that employ procedural or declarative mechanisms. Structured Query Language ("SQL"), for example, is a declarative language in which a query is expressed as a description of the desired result set. A database component typically translates the description from a declarative statement to a set of procedural instructions. The function-based query specification 104, in contrast, is expressed as a function of one or more parameters. The parameters may themselves consist of functions of additional parameters. Accordingly, the function-based query specification 104 may express a hierarchy of functions.

A translation component 110 of or associated with the storage engine 108 may parse the projection 103 and the function-based query specification 104 in order to identify the target and source of the update. The translation component 110 may also, in conjunction with the storage engine 108, cause a query plan to be formulated and executed. The function-based query specification 104 may be evaluated, and the results may be applied to the regions of the sub-hierarchy of objects specified by projection 103. A new object $O_2$ may be formed by copying object $O_1$ and changing the portions of the hierarchy of sub-objects specified by the projection 103, using the results of evaluating the function-based query specification 104.

Figure 2:
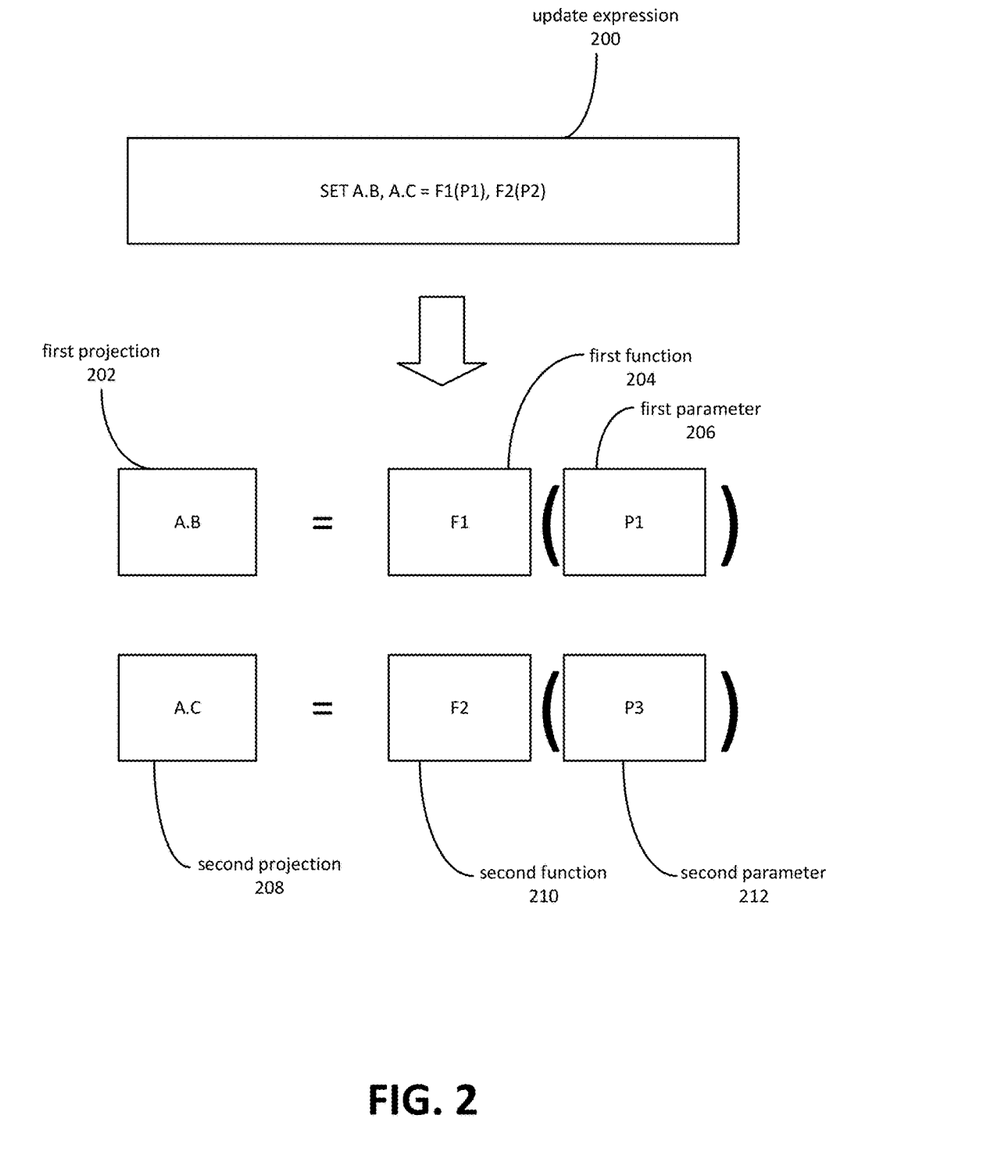
FIG. 2 is a block diagram depicting an update expression comprising projections and functional expressions.

Projections and function-based query specifications may be further understood in view of FIG. 2, which is a block diagram depicting an update expression comprising projections and functional expressions. FIG. 2 depicts an update expression 200 written as "SET A·B, A·C=F1(P1), F2(P2)." The target portion of update expression 200 is "A·B, A·C," and may be described as a tuple of two values, as a projection of two values, or as two projections—a first projection 202 and a second projection 208. The source portion of update expression 200 is "F1(P1), F2(P2)," and may be described as a tuple of two functions, or as a first function 204 of a first parameter 206 and a second function 210 of a second parameter 212. Note that in this case, the tuple of two functions returns two values, corresponding to the two projections in the target portion of the update expression 200.

Figure 3:
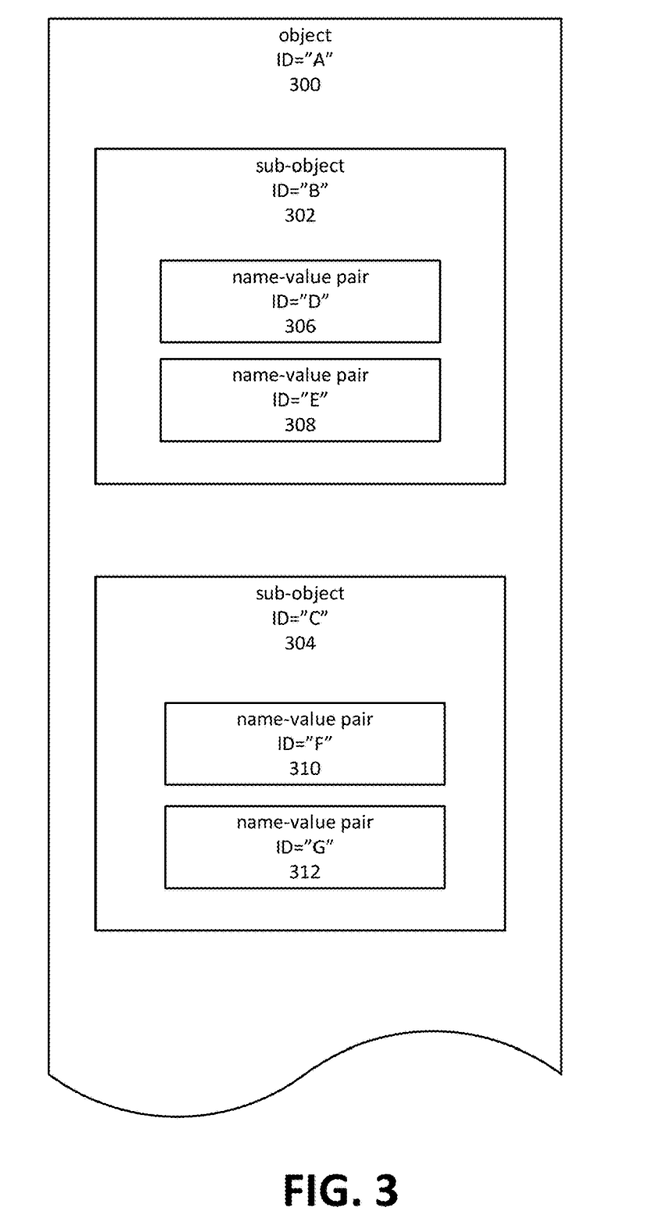
FIG. 3 is a block diagram depicting an example of a structured or semi-structured object.

Projections may be expressed as paths through a hierarchy of sub-objects contained within an object maintained in a repository. A repository, such as a key-value database or a relational database, may maintain structured or semi-structured objects on a storage device. The objects may, for example, be stored in a row or item collection associated with a key value. Requests to update the object may, accordingly, involve accessing the row or item collection and within the object itself. FIG. 3 is a block diagram depicting an example of a structured or semi-structured object. Other examples might include arrays, lists, or other structures. Some of these structures may be "flat" hierarchies, such as an array or a list of simple objects, sometimes referred to as values, such as strings, integers, or floating point numbers. An array, list, or other structure may, however, contain a number of nested sub-objects.

In the example of FIG. 3, an object 300 may consist of a hierarchy of objects, which may be referred to as sub-objects. By way of example, FIG. 3 depicts sub-objects 302 and 304 as children in an object hierarchy that has a parent object 300 as a root. Each object may include additional data in a variety of forms, one example of which is the name-value pairs depicted in FIG. 3 as name-value pairs 306-312. A name-value pair may be described as a sub-object comprising two sub-objects: a name sub-object and a value sub-object.

The object 300, sub-objects 302 and 304, and name-value pairs 306-312 may be associated with identifiers. In some cases, the object may have an explicit identifier field. In other cases, another field may be used. For example, a property of sub-object 302 might be used as an identifier. Similarly, a name and/or value of a name-value pair 306-312 might be used as an identifier. These identifiers may be concatenated or otherwise joined to express a path identifier, which may be used to locate a particular sub-object or a region of the hierarchy of sub-objects having the identified object as its root. This may be seen in FIG. 4, which is a block diagram depicting an example of locating regions of a hierarchy of sub-objects using a path identifier.

Figure 4:
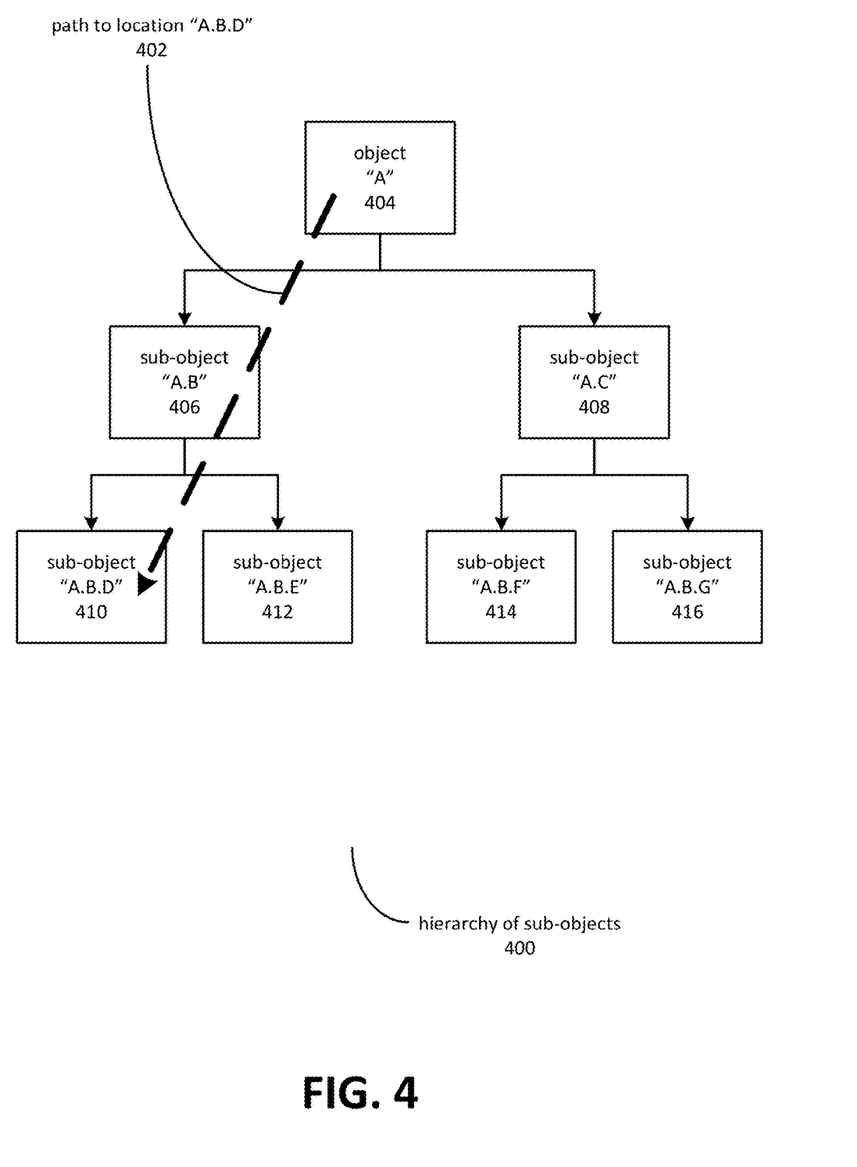
FIG. 4 is a block diagram depicting an example of locating regions of a hierarchy of sub-objects using a path identifier.

FIG. 4 depicts a sub-hierarchy of objects 400 corresponding to the object depicted in FIG. 3. The object 404 may itself be treated as the root of a hierarchy of sub-objects. In this example, the object 404 has two children, sub-objects 406 and 408, which in turn contain sub-objects 410-412 and sub-objects 414-416, respectively.

A location in the hierarchy of sub-objects 400 may be identified by forming a path identifier from identifiers (or other characteristics) of the objects and sub-objects on a path to the location. For example, a path to location "A·B·D" 402 may be derived from steps through the hierarchy of sub-objects, beginning with the root object 404. A path to the root object 404 might be expressed, in this example, as "A." Similarly, a path to sub-object 406 might be expressed as "A·B," and finally a path to sub-object 410 as "A·B·D."

A region of the hierarchy of sub-objects 400 may also be identified by a path. The region may include the sub-object identified by the path as well as some or all of its children. Typically, all of the descendants of a sub-object may be considered to be part of a region specified by a path to the sub-object.

Figure 5:
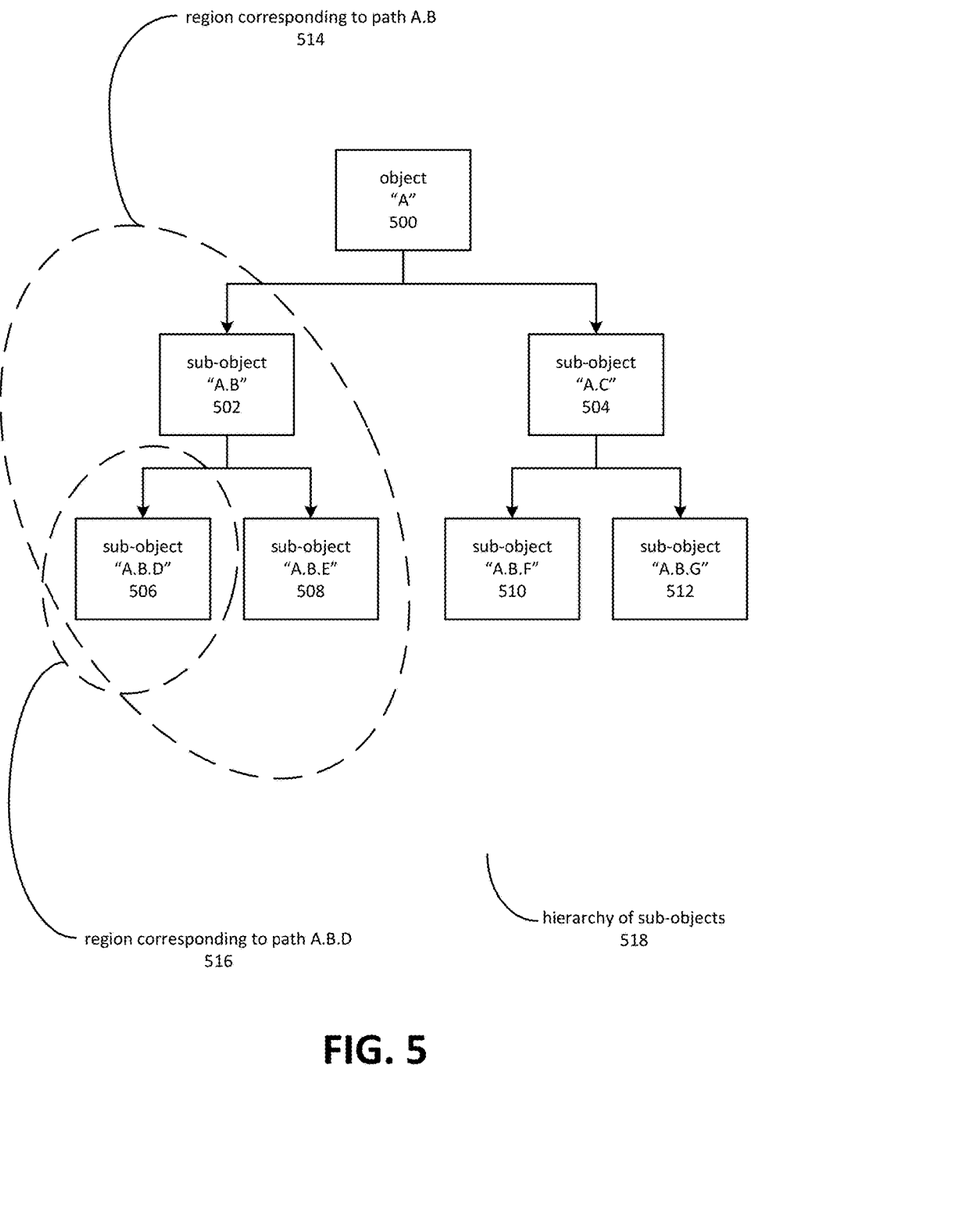
FIG. 5 depicts an example of regions of a sub-hierarchy of objects identified by paths to locations in the sub-hierarchy.

FIG. 5 depicts an example of regions of a sub-hierarchy of objects identified by paths to locations in the sub-hierarchy. In the example of FIG. 5, a hierarchy of sub-objects 518 may comprise object 500 and its sub-objects 502-512. A region 514 of sub-objects referred to by the path identifier "A·B" may include the sub-object 502 identified by the path "A·B," as well as all of its descendent sub-objects 506-508. A second region 516 may be identified by the path "A·B·D."

The region 514 corresponding to path "A·B" may be said to overlap with the region 516 corresponding to path "A·B·D." Regions overlap when they share at least one element in common. In this example, the two regions 514 and 516 overlap because they each contain sub-object 506.

Referring back to FIG. 1, when storage engine 108 processes a request to update an object, it may process the request by identifying the target and source portions of the request, identifying and evaluating the projections specified in the target portion, identifying an devaluating the functions specified in the source portion, and then applying the results of those functions to the portions of the object specified in the projections. This may be done by forming a new copy of the object in which the regions identified by the projections have been replaced with the results of evaluating the functions.

Embodiments may, as disclosed herein, ensure that the projections do not specify overlapping portions of the hierarchy of sub-objects. This may be done to increase efficiency of processing related to replacing the regions of the hierarchy of sub-objects. When regions of the hierarchy are overlapped, the functional nature of the source portion of the request to update the object may be disrupted. For example, the order in which the regions are replaced may affect the resulting object if the regions overlap. Accordingly, embodiments may verify that the projections included in a request to update an object do not specify overlapping regions.

Figure 6:
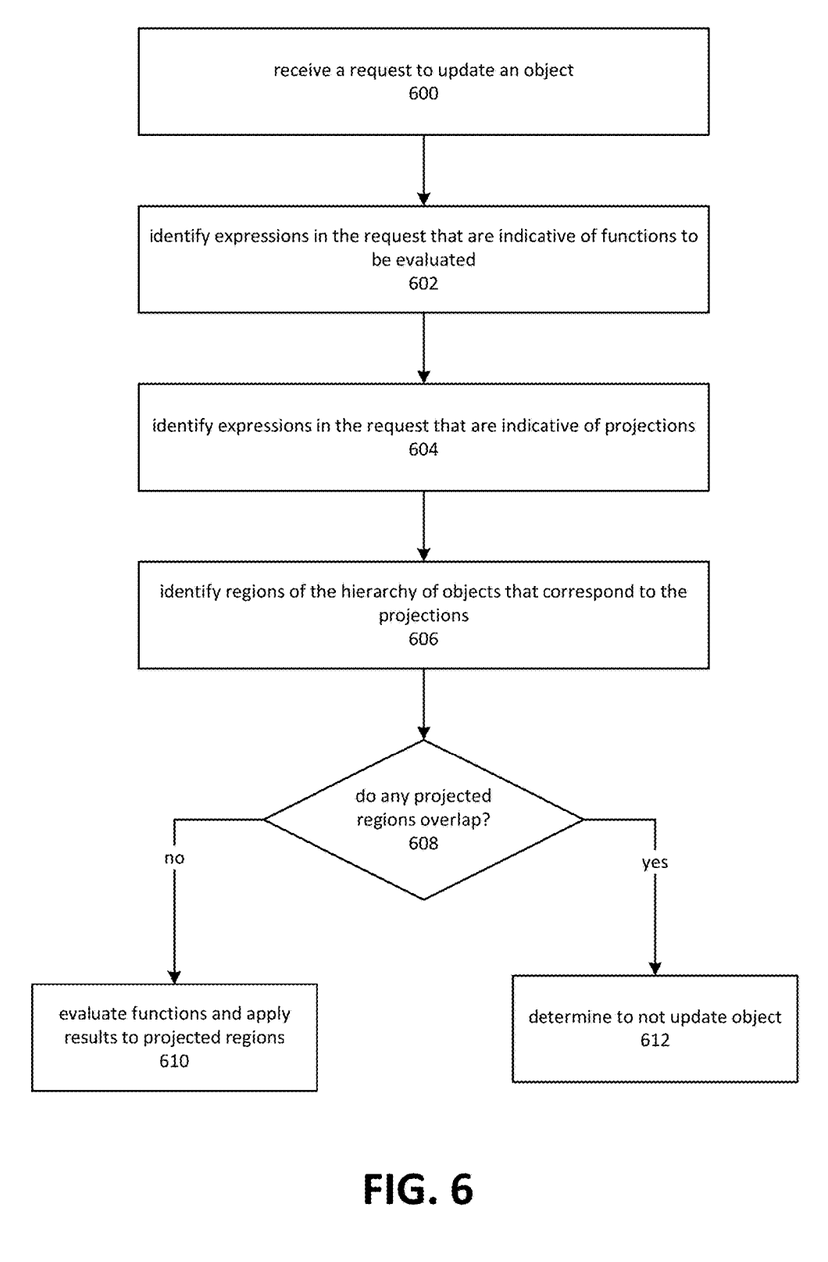
FIG. 6 is a flow diagram depicting verification of a projection.

FIG. 6 is a flow diagram depicting verification of a projection. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 600 depicts receiving a request to update an object stored in a repository. Referring to FIG. 1, the repository 106 may receive the request and direct storage engine 108 to process it. Next, block 602 depicts identifying expressions in the request that are indicative of the function or functions that are to be evaluated. This may involve storage engine 108 and translation component 110 parsing textual information included in the request. The operations of block 602 may be performed in conjunction with the operations of block 604, which depicts identifying expressions in the request that are indicative of projections.

As depicted by block 606, the storage engine 108 and translation component 110 may then identify regions of the hierarchy that correspond to the projection. This may be performed partially during the operations of blocks 602-604, by locating path identifiers used as projections on the target side of an update expression. Each path identifier may be further decomposed into one or more identifiers of steps in the path. The path and step information may be utilized in subsequent operations, such as those of block 608, to determine if any of the projected regions overlap. Note that, in this context, projected regions refer to the target portion of an update expression. There may be other projections in the request to update the object that are not part of the target, and that therefore may be permitted to specify overlapping regions.

In some instances, the targets of a projection may be determined through full or partial evaluation of an expression. For example, a query might contain a conditional expression that indicates a portion of the hierarchy to be updated if the condition is true. In other cases, evaluation of a case or switch statement might indicate which among multiple possible regions of a hierarchy are to be updated. Accordingly, certain regions of the hierarchy may be potentially overlapping, but whether or not the overlap is to occur may not be known until the expression is at least partially evaluated.

Block 608 depicts determining if any of the projections in a target portion of a request to update the object correspond to overlapping regions of the object. In some cases, the storage engine 108 or translation component 110 may make the determination based on inspection of the identifiers. For example, the identifiers "A·B" and "A·B·D" may be considered overlapping because "D" is identifiable as a child of "B" based on the path identifiers. In some cases, the determination may require further evaluation. This could be the case, for example, when a step in a projection is expressed as a function. For example, a path might be expressed as "A·B·ElementAt(x)." In such cases, the projection may first be evaluated to determine which portion of the hierarchy of sub-objects to which it refers. In some cases, embodiments may determine that projections apply to overlapping regions of the hierarchy. However, as with other types of conditional expressions, whether or the regions overlap may not be determinable until the expression is at least partially evaluated.

As depicted, operations associated with block 610 may be performed if the projections do not specify any overlapping regions. Block 610 depicts evaluating the function or functions that make up the source portion of the update request and then applying the results, in some way, to the projected regions of the hierarchy of sub-objects. The results may be applied in a number of ways. Generally speaking, however, the result of the application is an object in which the projected regions have been replaced with the results of evaluating function or functions that make up the source portion of the update request.

The operations of block 612 may be performed when one or more of the projected regions overlap. As depicted by block 612, this may involve determining to not update the object. In some cases and embodiments, further processing may be employed to determine if a conflict exists between the results to be applied to the overlapping regions. For example, if the overlapping regions specified by the paths "A·B" and "A·B·D" are to be updated, there may not be a conflict if the nature of the updates is such that they may be applied in any order. This might occur, for example, if the update to the region "A·B" changed data in a sub-region "A·B·E" but not in the region "A·B·D." In other cases, the storage engine 108 or translation component 110 may simply prohibit all overlapping regions. When detected, the storage engine 108 or translation component 110 may determine to not process the request to update the object. The storage engine 108 or translation component 110 might also transmit, to client device 100, an indication that the request will not be processed.

If a request to update an object contains one or more conditional expressions, such that regions of a hierarchy may potentially overlap, there are at least two possible approaches. In some instances, embodiments may determine to not process an update when a request to update an object contains expressions that may potentially overlap. In other embodiments, evaluation of the object may continue until the conditional expressions may be evaluated and the regions of the hierarchy that will be updated are known. Once the targeted regions are known, an error condition may be raised if the regions overlap.

Figure 7:
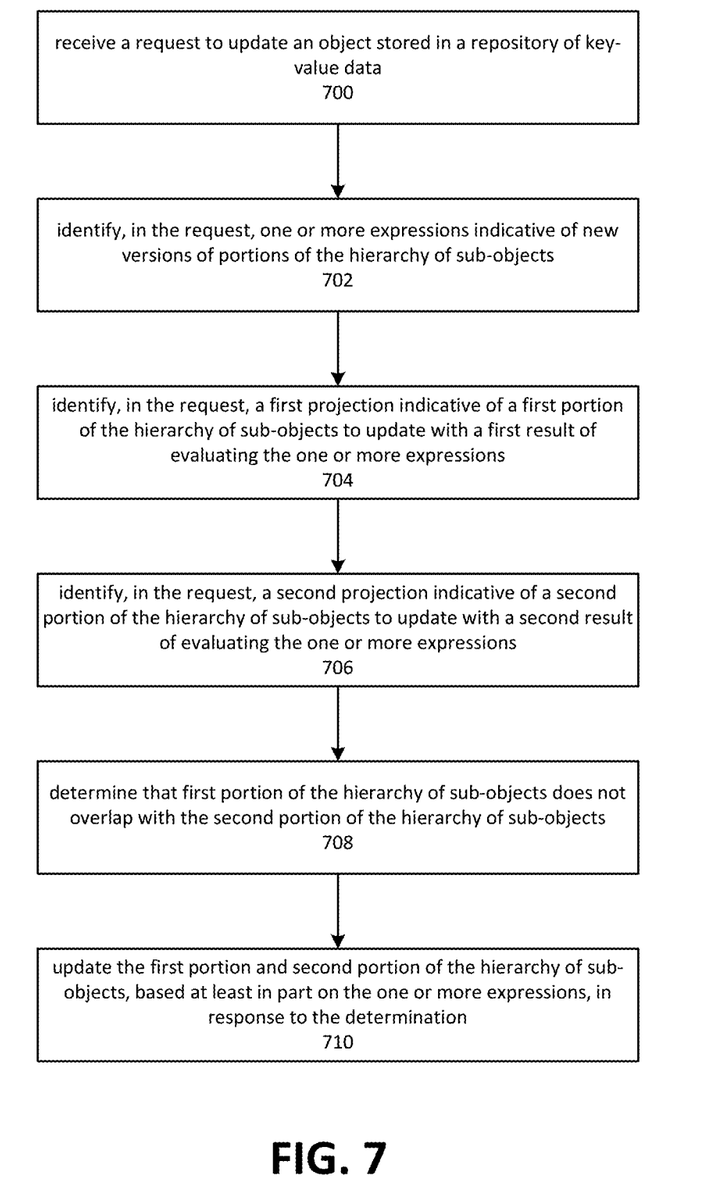
FIG. 7 is a flow diagram depicting updating a structured or semi-structured object using projection verification.

FIG. 7 depicts updating a structured or semi-structured object using projection verification. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 700 depicts receiving a request to update an object stored in a repository of key-value data. The request may, for example, comprise textual information specifying a source and target of the request. The source portion may be specified as one or more functional expressions. As used herein, functional refers to a programmatic technique in which the evaluation of the source portion of the command produces no side effects with respect to the object being acted upon. For example, the update command may refer to an object $O_1$, but the object $O_1$ is not modified by evaluation of the source portion of the update request.

Block 702 depicts identifying, in the request, one or more expressions indicative of new (or equivalently, updated) versions of portions of the hierarchy of sub-objects. These expressions may correspond to the source portion of an update request, as described herein. Identifying the expression may involve parsing textual information included in the update request and thereby locating the source portion.

Block 704 depicts identifying, in the request, a first projection indicative of a first portion of the hierarchy to update based on the one or more expressions. Similarly, block 706 depicts identifying a second projection indicative of a second portion of the hierarchy to update based on the one or more expressions. These operations may involve parsing textual information included in the update request, and may be performed in conjunction with the operations depicted by block 702.

Block 708 depicts determining that the first portion of the hierarchy of sub-objects does not overlap with the second portion of the hierarchy of sub-objects. Path information contained in the identified projections may be compared to determine if the paths specify overlapping portions of the hierarchy. In some cases, the projection may be represented as an expression that may be evaluated. The evaluated projection may then be evaluated to determine if the region of the sub-hierarchy that it refers to overlaps with another projection in the update expression.

Block 710 depicts updating the first and second portions of the hierarchy of sub-objects based on the one or more expressions identified by the operations of block 702. This process may be done, in some instances, by loading the original object from a storage device into memory, locating the regions of memory corresponding to the projected portions of the hierarchy of sub-objects, and replacing those regions with the results of the one or more expressions. The new version of the object may then be written to storage to replace the prior version of the object.

The operations of block 710 are performed partially in response to the determination, as depicted by block 708, that the first portion of the hierarchy of sub-objects does not overlap with the second portion. Embodiments may therefore proceed with updating the first and second portions of the hierarchy of sub-objects when the portions do not overlap. If they do overlap, embodiments may instead determine to not complete processing of the update request.

Another aspect of the operations depicted by block 710 may involve determining that the data types associated with the results of evaluating the right-hand side of the expressions is compatible with the types associated with the left-hand side. In other words, the region of the hierarchy indicated by the projections may be compared, with respect to type compatibility, to results that may be produced by evaluating the right-hand side of the expression. A data type associated with the result of evaluating the right-hand side expressions may be compared to one or more types associated with the projection and the region of the hierarchy that it corresponds to. If the two are compatible, the hierarchy may be updated. If the two data types are not compatible, the request to update the object may be rejected.

Figure 8:
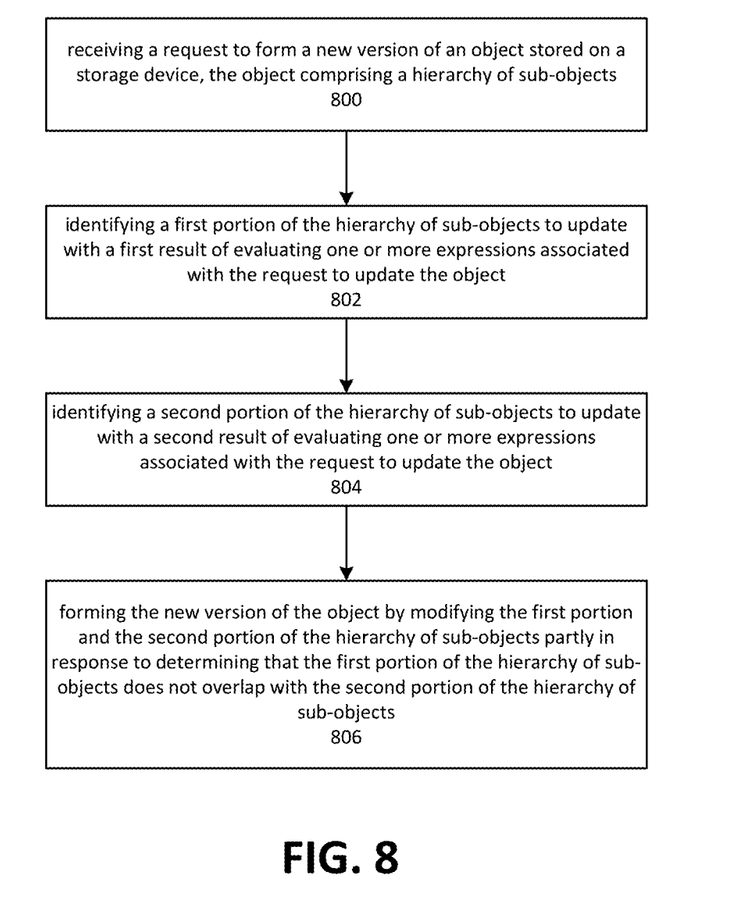
FIG. 8 is a flow diagram depicting a method for projecting update targets in a structured or semi-structured object.

Aspects of the invention may be further illustrated by FIG. 8, which is a flow diagram depicting a method for projecting update targets in a structured or semi-structured object. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 800 depicts receiving a request to update a structured or semi-structured object stored on a storage device. The object, being structured or semi-structured, may comprise a hierarchy of sub-objects.

Block 802 depicts identifying a first portion of the hierarchy of sub-updates to update with a first result of evaluating expressions associated with the request to update the object. The expressions may correspond to the source portion of the request to update the object.

Block 804 depicts identifying a second portion of the hierarchy of sub-objects to update with a second result of evaluating the expressions. Note that the source portion of the request to update the object may produce a number of values, which may be mapped to the projections of the target portion of the request.

Block 806 depicts updating the first and second portions of the hierarchy of sub-objects partly in response to determining that the first portion of the hierarchy of sub-objects does not overlap with the second portion of the hierarchy of sub-objects. The updating may, in some instances, be performed on a copy of the object loaded into memory. The updated object may then be returned to a calling device, used to replace the prior version of the object, or added to a storage device as a new object.

Figure 9:
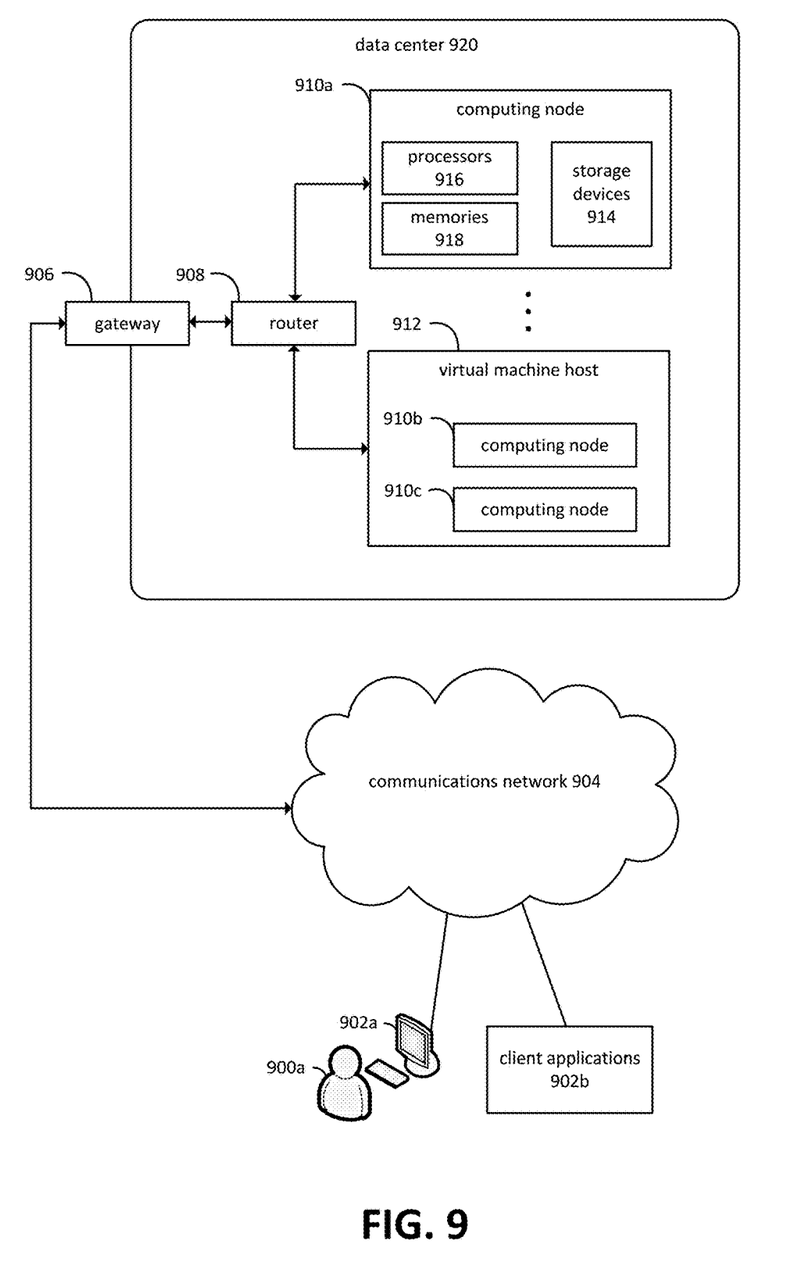
FIG. 9 is a block diagram depicting an embodiment of a computing environment in which aspects of the present disclosure may be practiced.

FIG. 9 is a diagram depicting an example of a distributed computing environment on which aspects of the present invention may be practiced. Various users 900a may interact with various client applications, operating on any type of computing device 902a, to communicate over communications network 904 with processes executing on various computing nodes 910a, 910b, and 910c within a data center 920. Alternatively, client applications 902b may communicate without user intervention. Communications network 904 may comprise any combination of communications technology, including the Internet, wired and wireless local area networks, fiber optic networks, satellite communications, and so forth. Any number of networking protocols may be employed.

Communication with processes executing on the computing nodes 910a, 910b, and 910c, operating within data center 920, may be provided via gateway 906 and router 908. Numerous other network configurations may also be employed. Although not explicitly depicted in FIG. 9, various authentication mechanisms, web service layers, business objects, or other intermediate layers may be provided to mediate communication with the processes executing on computing nodes 910a, 910b, and 910c. Some of these intermediate layers may themselves comprise processes executing on one or more of the computing nodes. Computing nodes 910a, 910b, and 910c, and processes executing thereon, may also communicate with each other via router 908. Alternatively, separate communication paths may be employed. In some embodiments, data center 920 may be configured to communicate with additional data centers, such that the computing nodes and processes executing thereon may communicate with computing nodes and processes operating within other data centers.

Computing node 910a is depicted as residing on physical hardware comprising one or more processors 916, one or more memories 918, and one or more storage devices 914. Processes on computing node 910a may execute in conjunction with an operating system or alternatively may execute as a bare-metal process that directly interacts with physical resources, such as processors 916, memories 918, or storage devices 914.

Computing nodes 910b and 910c are depicted as operating on virtual machine host 912, which may provide shared access to various physical resources, such as physical processors, memory, and storage devices. Any number of virtualization mechanisms might be employed to host the computing nodes.

The various computing nodes depicted in FIG. 9 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in non-virtualized form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. A virtualization-based computing node therefore also encompasses the physical hardware needed to execute the virtualization resources. A computing node may be configured to execute an operating system as well as one or more application programs. In some embodiments, a computing node might also comprise bare-metal application programs.

Figure 10:
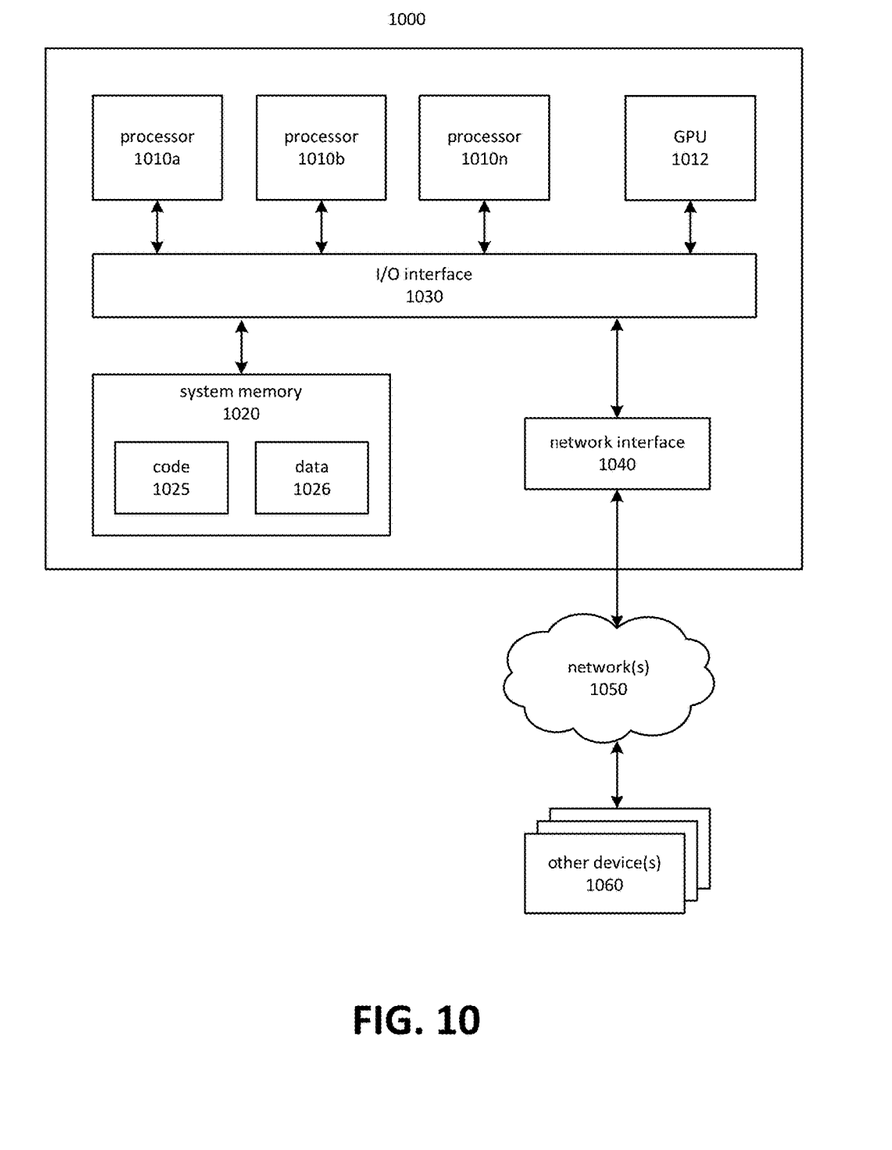
FIG. 10 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 10 depicts a general-purpose computer system that includes or is configured to access one or more computer-accessible media. In the illustrated embodiment, computing device 1000 includes one or more processors 1010a, 1010b, and/or 1010n (which may be referred herein singularly as a processor 1010 or in the plural as the processors 1010) coupled to a system memory 1020 via an input/output ("I/O") interface 1030. Computing device 1000 further includes a network interface 1040 coupled to I/O interface 1030.

In various embodiments, computing device 1000 may be a uniprocessor system including one processor 1010 or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures ("ISAs"), such as the x86, PowerPC, SPARC or MIPS ISAs, or any other suitable ISA. In multiprocessor systems, each of processors 1010 may commonly, but not necessarily, implement the same ISA.

In some embodiments, a graphics processing unit ("GPU") 1012 may participate in providing graphics rendering and/or physics processing capabilities. A GPU may, for example, comprise a highly parallelized processor architecture specialized for graphical computations. In some embodiments, processors 1010 and GPU 1012 may be implemented as one or more of the same type of device.

System memory 1020 may be configured to store instructions and data accessible by processor(s) 1010. In various embodiments, system memory 1020 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 1020 as code 1025 and data 1026.

In one embodiment, I/O interface 1030 may be configured to coordinate I/O traffic between processor 1010, system memory 1020, and any peripherals in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect ("PCI") bus standard or the Universal Serial Bus ("USB") standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computing device 1000 and other device or devices 1060 attached to a network or networks 1050, such as other computer systems or devices, for example. In various embodiments, network interface 1040 may support communication via any suitable wired or wireless general data networks, such as types of Ethernet networks, for example. Additionally, network interface 1040 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 1020 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 1000 via I/O interface 1030. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 1000 as system memory 1020 or another type of memory. Further, a computer-accessible medium may include transmission media or signals, such as electrical, electromagnetic or digital signals, conveyed via a communication medium, such as a network and/or a wireless link, such as those that may be implemented via network interface 1040. Portions or all of multiple computing devices, such as those illustrated in FIG. 10, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for updating objects maintained in a repository of key-value data, the system comprising:
   one or more computing nodes configured as the repository of key-value data, the one or more computing nodes comprising instructions that, when executed by a processor of the one or more computing nodes, cause the system at least to:
   receive a request to update an object stored in the repository of key-value data, the object comprising a hierarchy of sub-objects;
   identify, in the request, one or more expressions indicative of forming versions of a first portion of the hierarchy of sub-objects and a second portion of the hierarchy of sub-objects;
   identify, in the request, a first projection indicative of the first portion of the hierarchy of sub-objects to update based on the one or more expressions;
   identify, in the request, a second projection indicative of the second portion of the hierarchy of sub-objects to update based on the one or more expressions;
   determine that the first portion of the hierarchy of sub-objects indicated by the first projection does not overlap with the second portion of the hierarchy of sub-objects indicated by the second projection; and
   update the first portion and second portion of the hierarchy of sub-objects, based at least in part on the one or more expressions, in response to the determination.

2. The system of claim 1, wherein the first projection comprises an identifier indicative of a path from a root of the hierarchy of sub-objects to a location in the first portion of the hierarchy of sub-objects.

3. The system of claim 1, wherein the one or more computing nodes comprise further instructions that, when executed by the processor, cause the system at least to:
   receive an additional request to update the object;
   identify, in the additional request, a first additional projection indicative of a first additional portion of the hierarchy of sub-objects;
   identify, in the additional request, a second additional projection indicative of a second additional portion of the hierarchy of sub-objects; and
   transmit information indicative of not updating the object in response to the additional request, based at least in part on determining that the first additional portion of the hierarchy of sub-objects overlaps with the second additional portion of the hierarchy of sub-objects.

4. The system of claim 1, wherein the one or more expressions comprise an association between a projection and a specification of an immutable function.

5. The system of claim 1; wherein the updating the first portion of the hierarchy of sub-objects comprises forming a copy of the object in which the first portion of the hierarchy of sub-objects is replaced with a result of evaluating the one or more expressions.

6. A method comprising:
   receiving a request to form a new version of an object stored on a storage device, the object comprising a hierarchy of sub-objects;
   identifying, based at least in part on information included in the request, a first portion of the hierarchy of sub-objects to modify with a first result of evaluating one or more expressions included in the request to update the object;
   identifying, based at least in part on information included in the request, a second portion of the hierarchy of sub-objects to modify with a second result of evaluating one or more expressions included in the request to update the object; and
   forming the new version of the object by modifying the first portion and the second portion of the hierarchy of sub-objects partly in response to determining that the first portion of the hierarchy of sub-objects does not overlap with the second portion of the hierarchy of sub-objects.

7. The method of claim 6, wherein identifying the first portion of the hierarchy of sub-objects comprises evaluating a first projection of the hierarchy of sub-objects specified by the request.

8. The method of claim 7, wherein the first projection is indicative of a path from a root of the hierarchy of sub-objects to a location in the first portion of the hierarchy of sub-objects.

9. The method of claim 6, further comprising:
   receiving an additional request to update the object; and
   determining to not update the object in response to the additional request, based at least in part on identifying a first additional portion of the hierarchy of sub-objects to update, identifying a second additional portion of the hierarchy of sub-objects to update, and determining that the first additional portion overlaps with the second additional portion.

10. The method of claim 6, further comprising:
    determining a first data type associated with the first result of evaluating the one or more expressions; and
    determining to modify the first portion of the hierarchy based at least in part on the data type associated with the first result being compatible with a second data type associated with the second portion of the hierarchy.

11. The method of claim 6, wherein the updating the first portion of the hierarchy of sub-objects comprises forming a copy of the object in which the first portion of the hierarchy of sub-objects is replaced with the first result of evaluating the one or more expressions.

12. The method of claim 6, further comprising:
    determining that all portions of the hierarchy of sub-objects to be updated with results of evaluating the one or more expressions are non-overlapping.

13. The method of claim 6, further comprising:
mapping results of evaluating the one or more expressions to projections specified by the request, the projections identifying portions of the hierarchy of sub-objects to update.

14. A non-transitory computer-readable storage medium having stored thereon instructions that; upon execution by one or more computing devices, cause the one or more computing devices at least to:
receive a request to update an object stored in a data repository, the object comprising a hierarchy of sub-objects;
identify, based on a first expression included in the request, a first portion of the hierarchy of sub-objects to update with a first result of evaluating one or more expressions of the request to update the object;
identify, based on a second expression included in the request, a second portion of the hierarchy of sub-objects to update with a second result of evaluating the one or more expressions of the request to update the object; and
update the first portion and the second portion of the hierarchy of sub-objects partly in response to determining that the first portion of the hierarchy of sub-objects does not overlap with the second portion of the hierarchy of sub-objects, the first portion updated based at least in part on the first result, the second portion updated based at least in part on the second result.

15. The non-transitory computer-readable storage medium of claim 14, comprising further instructions that, upon execution by the one or more computing devices, cause the one or more computing devices to at least:
identify the first portion of the hierarchy of sub-objects by at least evaluating first projection of the hierarchy of sub-objects specified by the request.

16. The non-transitory computer-readable storage medium of claim 14, comprising further instructions that, upon execution by the one or more computing devices, cause the one or more computing devices to at least:
receive an additional request to update the object; and
determine to not update the object n response to the additional request; based at least in part on identifying a first additional portion of the hierarchy of sub-objects to update, identifying a second additional portion of the hierarchy of sub-objects to update, and determining that the first additional portion overlaps with the second additional portion.

17. The non-transitory computer-readable storage medium of claim 14, wherein the one or more expressions define one or more functions.

18. The non-transitory computer-readable storage medium of claim 14, comprising further instructions that, upon execution by the one or more computing devices, cause the one or more computing devices to at least:
determine that an expression of the one or more expressions is indicative of a conditional update to an additional portion of the hierarchy of sub-objects; and
update the additional portion of the hierarchy of sub-objects based at least in part on determining that the additional portion of the hierarchy of sub-objects does not overlap with the first and second portions of the hierarchy of sub-objects.

19. The non-transitory computer-readable storage medium of claim 14, comprising further instructions that, upon execution by the one or more computing devices, cause the one or more computing devices to at least:
determine that all portions of the hierarchy of sub-objects to be updated with results of evaluating the one or more expressions are non-overlapping.

20. The non-transitory computer-readable storage medium of claim 14, comprising further instructions that, upon execution by the one or more computing devices; cause the one or more computing devices to at least:
identify the first portion of the hierarchy of sub-objects by at least parsing a projection expression to determine one or more steps of a path through the hierarchy of sub-objects.

* * * * *